United States Patent Office 2,805,639
Patented Sept. 10, 1957

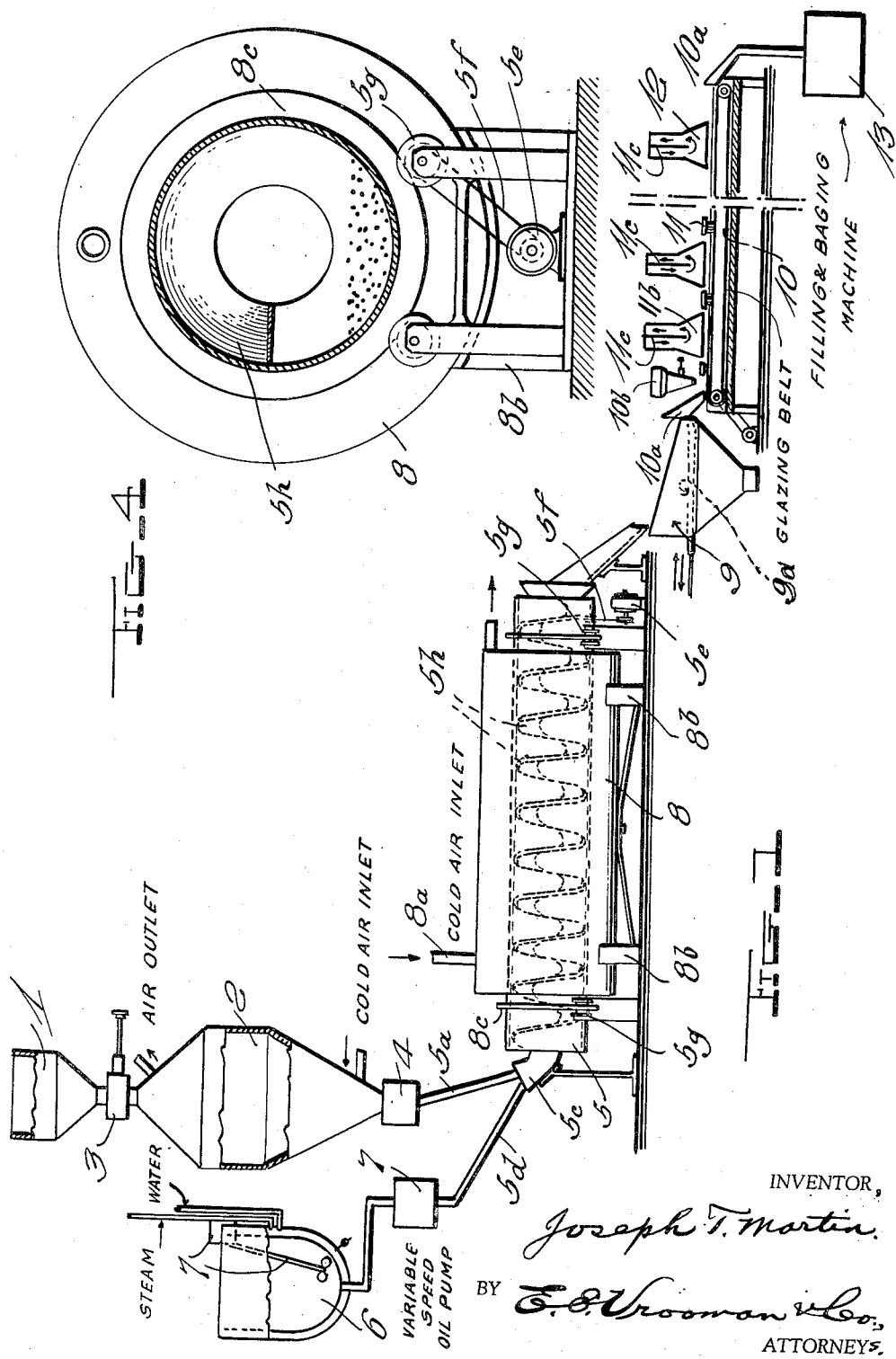

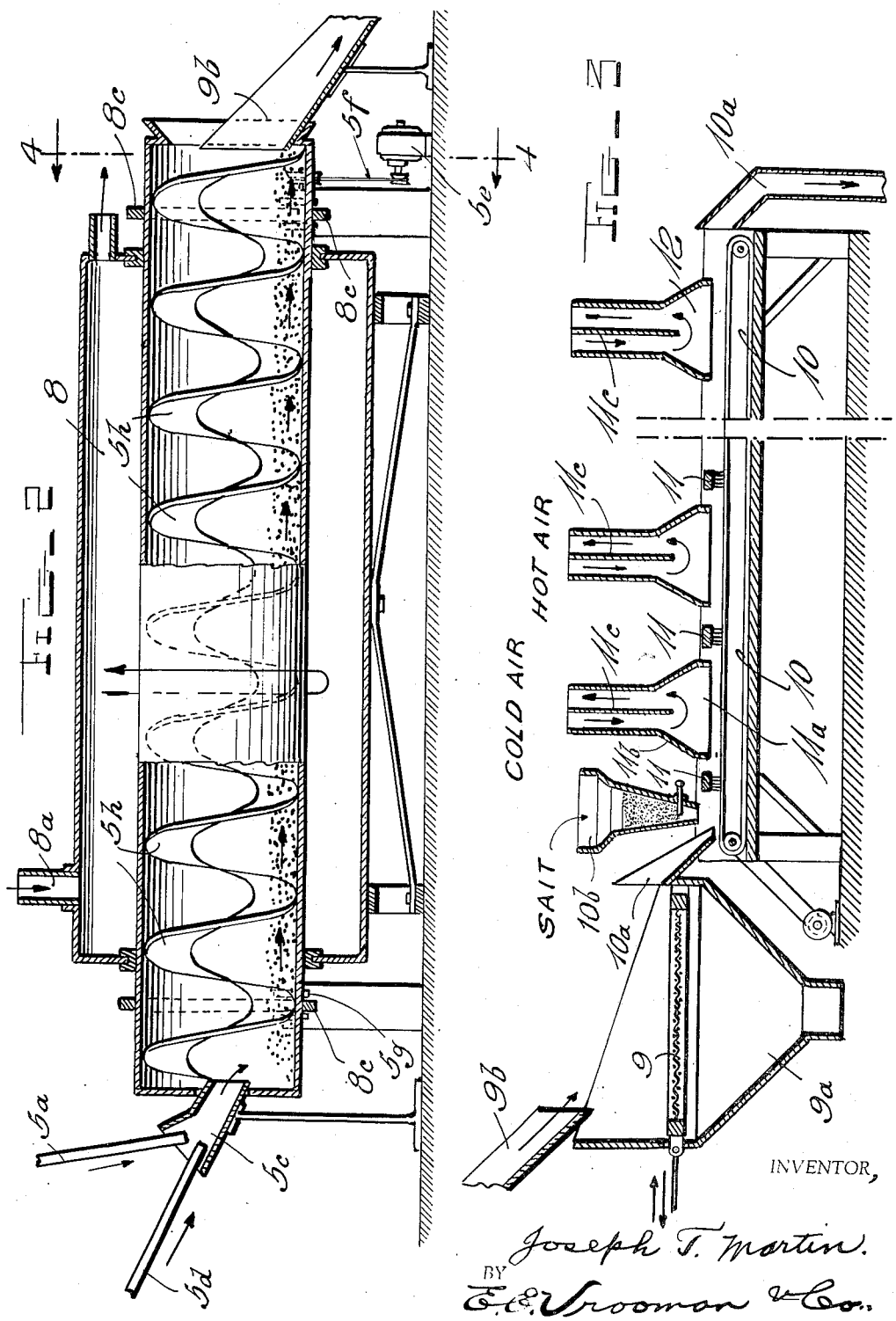

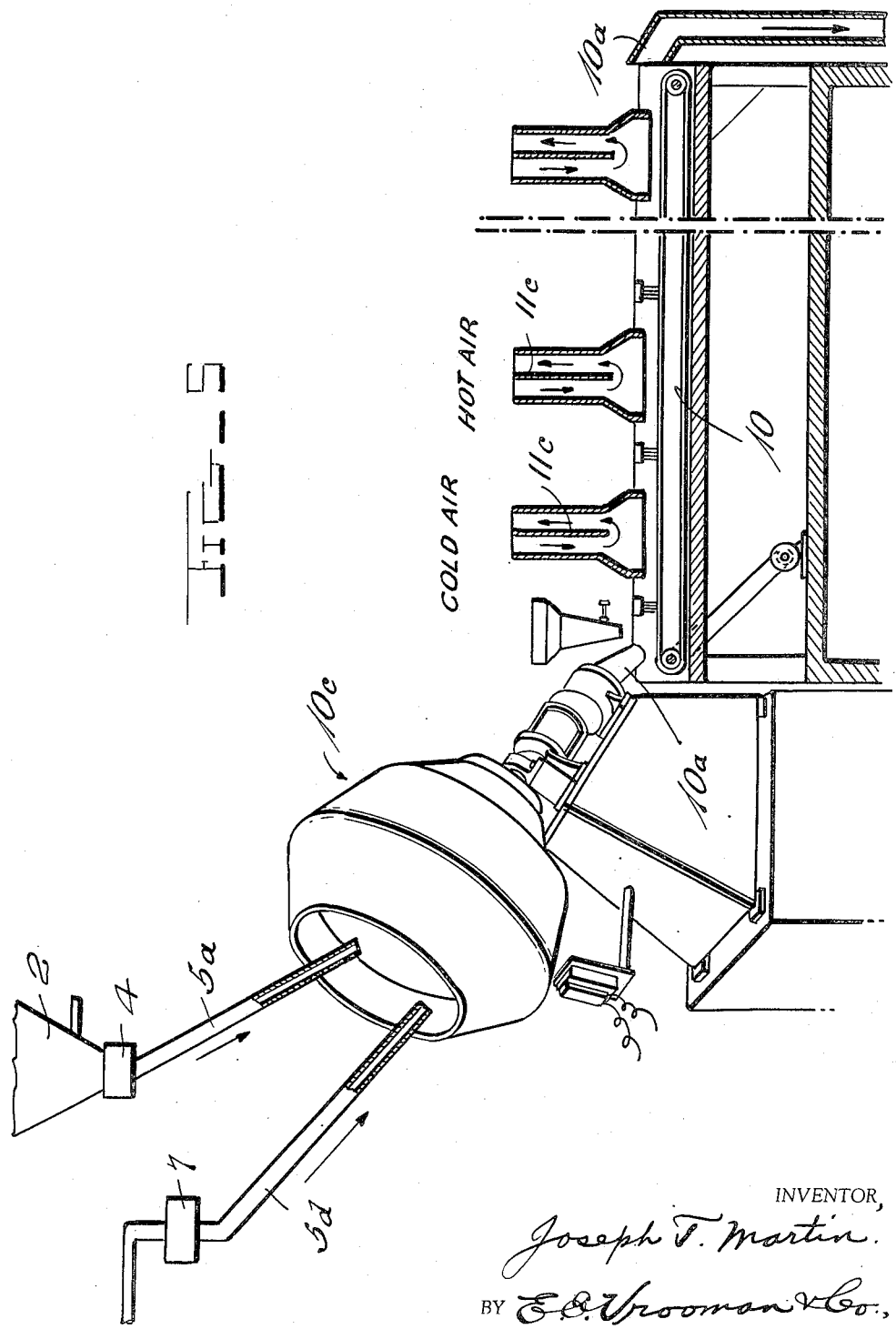

2,805,639

APPARATUS FOR PREPARING POPCORN AND OIL FOR INCLUSION IN A FILM BAG

Joseph T. Martin, Tampa, Fla., assignor to Pop Corn, Inc., Tampa, Fla., a corporation of Florida Application May 20, 1954, Serial No. 431,224

1 Claim. (Cl. 118—18)

This invention relates to a method and apparatus for preparing popcorn and oil for inclusion in a film bag.

In carrying out the invention the method involves the preparation of raw popcorn kernels, as well as the blending of vegetable oils used in such preparation, together with the apparatus for preparing said raw popcorn kernels with the blend of vegetable oil for packaging.

More particularly, an object of this invention relates to a method of surrounding each individual kernel of popcorn with sufficient vegetable oil of the blend mentioned to be ready to place in a conventional home popcorn popper or any home device that is used for popping popcorn directly from the film bag in which the prepared popcorn kernels are packed, the film bag holding enough popcorn for a batch of popped popcorn for the popcorn popper or home device for popping popcorn; the treating of the popcorn kernels eliminates any addition of vegetable oil in said popcorn popper or home popping device.

Another object of the invention is to provide a "free flowing" mass of individually coated popcorn kernels, such "free flowing" treated popcorn kernels provides a simple and inexpensive method of packing the treated popcorn kernels in a suitable film package or bag; the film package or bag being designed to properly preserve and display the product.

A still further object of the invention is to blend a treated vegetable oil with another treated vegetable oil to bring the melting point of such a blend to a fixed melting point, such melting point being sufficient to insure each kernel of popcorn keeping its individual coating under high temperatures after packaging.

Another object of the invention is to be able to use a conventional filler and bag machine with the "free flowing" kernels of individually coated popcorn, this eliminates a specially designed and expensive filling and bag machine; the film bag is of such a size that will be suitable for pouring the "free flowing" kernels into the home popcorn popper or other device used in the home for popping popcorn in the home, producing a satisfactory amount or "batch" of popped popcorn for home use.

Still another object of the invention relates to the elimination of the heavy glass containers that are used for packaging a complete package of popcorn, the resultant saving in weight allows a lower cost to the purchaser of a complete popcorn package; the package of treated popcorn kernels can be displayed at a better advantage over the glass package, use of racks for display being one of the possibilities.

Another object of the invention is to add a coating of salt to the kernels of individually coated popcorn, to control the amount of salt on the coating that it will be suitable for the average taste for salt on the resultant popped popcorn. The individual using a popcorn popper, or other home device for popping popcorn, usually is not aware of the correct amount of salt to add unless instructions are given on the package; the salt coating eliminates such instructions on the package; it insures a uniform salting to each popcorn "batch" from the contents of the film bag holding the treated and salted kernels of popcorn.

With the foregoing and other objects in view, this invention comprises certain novel method, constructions, combinations, and arrangements of parts as will be hereinafter fully described, illustrated in the accompanying drawings, and more particularly pointed out in the appended claim.

In the drawings:

Figure 1 is a view partly in section and in elevation of an apparatus constructed in accordance with this invention.

Figure 2 is an enlarged, fragmentary, longitudinal sectional view of the apparatus.

Figure 3 is an enlarged, fragmentary, longitudinal sectional view of the apparatus.

Figure 4 is a transverse sectional view taken on line 4—4, Figure 2, and looking in the direction of the arrows.

Figure 5 is a fragmentary view of another embodiment of this invention.

The vegetable oils used in the blend of treated oils are: hydrogenated cocoanut oil with a melting point of approximately 110° F. and a hydrogenated peanut oil with a melting point of approximately 140° F. These oils are mixed and melted in a suitable container and brought to a temperature of 180° F., agitated until blended properly. The melting point of the blended oils is 120° F. This melting point is controlled by a check of the correct melting points of the two hydrogenated oils mentioned above, there may be a slight variation in the melting points of the two hydrogenated oils as they come from the oil refinery, a positive control to bring the melting point of the blended oil to a melting point of 120° F. is possible by the proper mixtures in direct proportion to the melting points of the two oils being blended. The melting point of 120° being the correct temperature to keep the treated popcorn kernels with such a blend during all weather conditions as the package is being handled until sold to the consumer.

Referring to the drawings, the raw popcorn is placed in the bin 1 and is fed into the cooling chamber 2 by a conventional variable-speed feeding device 3. The chamber 2 is in communication with the feeding device 3. Raw popcorn in the cooling chamber 2 is chilled to a temperature of 35 to 45 degrees F., the chilling of the popcorn kernels insures a better surface for the blended oil to adhere to quickly and with an even coating. The chilled kernels are then passed through another conventional variable-speed feeding device 4 set at the same speed as the one above, designated by numeral 3; this controls the correct amount of popcorn entering the feeding chamber 5 by means of pipe 5a.

The proper mixture of hydrogenated oils described hereinbefore is placed in a conventional jacketed tank 6, the oils being agitated by the mixer 7; the blended oils are brought to a temperature of 180° F., and held at such a temperature by the proper heat control of the jacketed tank 6. The oil is passed through a variable-speed oil pump 7; this pump is set to control the proper amount of blended oil to the mixing chamber 5. The proper mixture of blended oil for popcorn being 2½ oz. of blended oil to 16 oz. of raw popcorn. The raw popcorn should have a moisture content of 13½ percent. The conventional variable-speed oil pump 7 feeds the blended oil directly to the feeding chamber 5.

The treating chamber 5 is of cylindrical structure, and revolves inside of the stationary cooling chamber 8, this cooling chamber 8 being fed with sufficient cool air, entering through pipe 8a, to quickly harden the blended oil around each grain of raw popcorn. The cooling chamber 8 is preferably of a cylindrical structure and rests upon supports 8b. The chamber 5 is provided with drive rings 8c outside of the ends of the cooling chamber 8. The pipe 5a empties into the hopper end 5c of the chamber 5. The variable-speed oil pump communicates with the hopper 5c by means of pipe 5d. The chamber 5 is rotated through the medium of motor 5e, Fig. 4, and by means of a belt 5f the roller 5g is rotated which causes rotation of the chamber 5. The treating chamber 5 has screw flights 5h that revolve and turn over and over the mixture of popcorn and blended oil as the mixture moves along the treating chamber, the revolving kernels of popcorn are coated with the blended oil and when the revolving mixture reaches the end of the treating chamber 5 each kernel is coated with the correct amount of blended oil and each kernel so coated is separate from each other kernel.

The popcorn kernels, each being surrounded by the correct amount of blended oil to pop the popcorn to its full popping volume, are discharged from the treating chamber 5 on to a vibrating screen 9 in the hopper-like device 9a; the discharging of the popcorn from chamber 5 into device 9a being accomplished by the chute 9b. The size of the openings in the vibrating screen 9 is variable, this is necessary due to the variation of sizes of the raw popcorn kernels that are treated; some type of raw popcorn kernels are larger than the others.

The treated popcorn kernels, each with the proper amount of blended oil as coating, now pass from the treating chamber 5 to the moving glazed belt 10, by means of chute 9b hopper-like device 9a and chute 10a. This operation is designed to put a glaze or gloss on each grain or kernel of treated popcorn. This glaze or gloss adds to the sales appeal of the treated popcorn kernels. Upon being deposited on the glazing belt 10 the kernels are spread evenly over the belt by means of brushes 11. Before the treated kernels reach the cooling area 11a, salt is distributed evenly over the treated kernels by a conventional feeder 10b of the same width of the belt 10; as the treated kernels pass along the belt 10 the salt adheres to the kernels, because the heating and cooling process insures the adhering of the salt to the treated kernels. The treated kernels pass through a cooling area at 11a. This cooling area is created by a unit 11b which has a central partition 11c so that cooled air may enter and pass out as indicated by arrows in Fig. 3. The kernels on the belt 10 then pass through a heated area by means of the device 12 which is similarly constructed to unit 11b. This last mentioned device 12 causes a heating area which is of such temperature as will properly glaze or gloss the outer coating of the treated kernel. This action is repeated on the belt as shown. Between each cold and hot units just described are arranged the brushes 11 which brushes are so adjusted with respect to the belt as to cause the kernels to turn over, this insures a coating of glazed oil over each kernel treated.

After the treated and glazed popcorn kernels leave the glazing belt 10 they pass to the pipe 10a into the bin 13 and are ready for packaging. The bin 13 is mounted above a conventional filling and back machine (not shown) which fills and seals each film bag; the film bag being properly printed in several colors which may carry the name of the producer with directions that may be necessary.

Each kernel of raw popcorn to be treated under this process should have a moisture content of 13½ percent for the maximum popping volume. When such raw popcorn kernels are treated under this process with the blended oil, all air is sealed off of the raw popcorn kernel and thereby holds the correct amount of moisture (13½ percent) in the kernel of popcorn so treated.

By addition of certified vegetable coloring to the blended oil, any desired color can be added to each kernel of treated popcorn. There can also be added a flavoring, a butter flavoring being an example.

Another method of coating the popcorn kernels with the blended hydrogenated oils can be described as the "bowl method"; this method is one of "batches" instead of the continuous method described hereinbefore. This method could be used in a small operation instead of the continuous method. A conventional "coater" Fig. 5 is used; it is a revolving bowl 10c set at an angle of 30° and driven directly by a motor at a speed of 30 R. P. M., the bowl 10c is jacketed and can be cooled in the conventional manner. Correctly measured charges of the blended oils and raw popcorn are inserted into the bowl 10c by the feeder 4 and the pump 7 through pipe 5a and 5d, Fig. 5. The bowl is rotated at the speed stated and the cooling mixture pumped or forced through the jacket; when the mixture, being revolved, reaches a temperature of 90° F. the popcorn kernels in the revolving mixture have picked up the blended oil and each kernel is separate from the other with the correct coating of blended oils. The revolving and cooling continue until the temperature reaches 75° F. and the treated popcorn kernels are ready to be dumped from the bowl 10c to the chute 10a to the glazing belt 10, etc.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In an apparatus of the class described, the combination of a supply bin, a variable feeding device under said bin and in communication therewith, a cooling chamber under said feeding device and in communication therewith, a variable feeding device under said cooling chamber, said last feeding device provided with a discharge spout, an oil receptacle provided with mixing means, a variable-speed oil pump in communication with said oil receptacle, a discharge pipe connected to said oil pump, a cooling chamber, a treating chamber rotating within said cooling chamber, said treating chamber provided with an open end, said pipes of the variable feeding device and the variable-speed oil pump discharging into said open end of the treating chamber, a chute at the opposite end of said treating chamber to said pipe receiving end, a vibrating screen device under said spout, an endless belt, a chute from said screen device discharging upon said belt, a hot air and a cold air device above said belt, each of said devices provided with a two-way passage, a brush between said hot and cold air devices, brushes outside of said hot and cold devices and engaging said belt, a receiving bin, and means for receiving popcorn kernels from said belt and discharging them into said bin.

References Cited in the file of this patent

UNITED STATES PATENTS

| | | |
|---|---|---|
| 1,073,945 | Warner | Sept. 23, 1913 |
| 1,552,293 | Gardner et al. | Sept. 1, 1925 |
| 2,421,801 | Miller | June 10, 1947 |
| 2,518,247 | Nairn | Aug. 8, 1950 |
| 2,551,748 | Laschinger | May 8, 1951 |
| 2,604,407 | Martin | July 22, 1952 |